United States Patent
Wankel

[15] 3,688,749
[45] Sept. 5, 1972

[54] SUPERCHARGED ROTARY COMBUSTION ENGINE

[72] Inventor: Felix Wankel, Lindau, Germany

[73] Assignees: Audi NSU Auto Union Aktiengesellschaft, Neckarsulm; Wankel G.m.b.H., Lindau, Bodensee, Germany

[22] Filed: April 21, 1971

[21] Appl. No.: 136,120

[30] Foreign Application Priority Data

April 21, 1970  Germany..........P 20 19 177.9

[52] U.S. Cl. ..................123/8.41, 123/8.05, 418/8, 418/22, 418/54, 418/60, 418/61, 60/901
[51] Int. Cl. ........................F02b 53/14, F01c 13/04
[58] Field of Search ..........123/8.05, 8.41; 418/8, 54, 418/60, 61, 16, 22, 31; 60/901

[56] References Cited
UNITED STATES PATENTS

| | | | |
|---|---|---|---|
| 3,259,113 | 7/1966 | Hamada | ......................418/60 |
| 3,359,954 | 12/1967 | Eiermann et al | .........418/61 X |
| 3,405,692 | 10/1968 | Paschke | ......................418/61 |
| 3,483,849 | 12/1969 | Yamamoto | ...........123/8.05 X |

*Primary Examiner*—Allen D. Herrmann
*Attorney*—Raymond P. Wallace and Victor D. Behn

[57]  ABSTRACT

A supercharged rotary engine having a three-lobed trochoidal housing providing an extra expansion chamber for prolonged expansion and extraction of more work from combustion gases, in which during final expansion the gases are mixed with air for more complete combustion and cleaner exhaust, and having a one-lobed trochoidal compressor driven by the engine shaft and transferring compressed air into the engine intake chamber for further compression for either diesel of hybrid operation.

9 Claims, 6 Drawing Figures

INVENTOR.
FELIX WANKEL

BY Raymond P. Wallace

AGENT

INVENTOR.
FELIX WANKEL

BY Raymond P. Wallace

AGENT

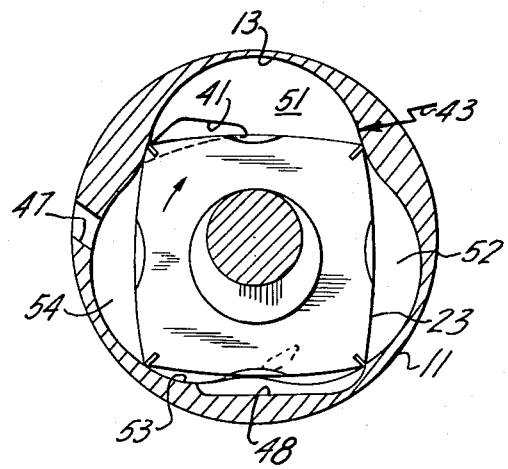
FIG. 3
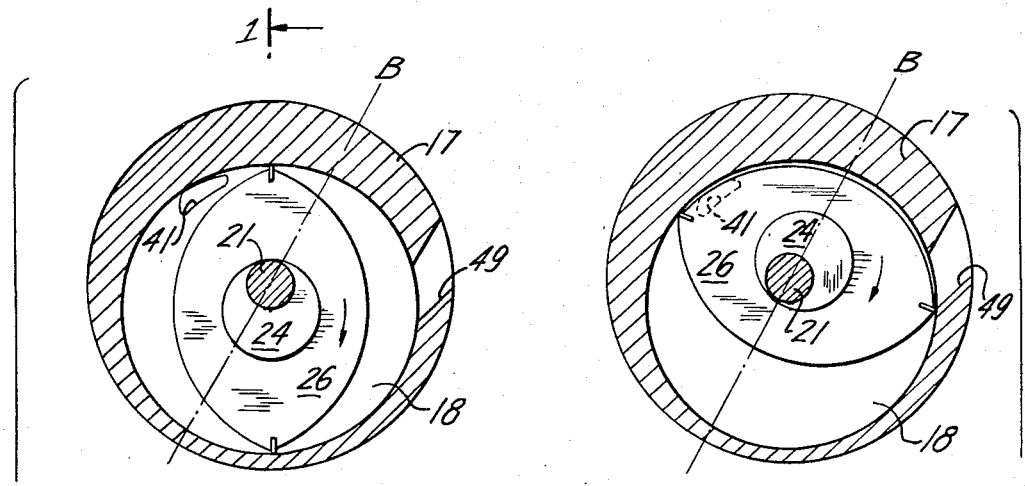
FIG. 4  FIG. 5
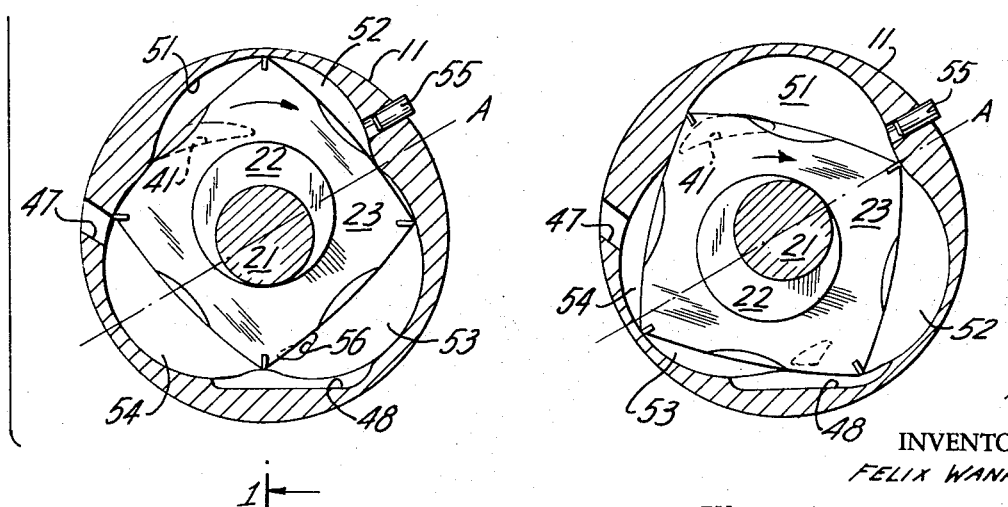
INVENTOR.
FELIX WANKEL
BY Raymond P. Wallace
AGENT

SUPERCHARGED ROTARY COMBUSTION ENGINE

BACKGROUND OF THE INVENTION

This invention relates to rotary engines of the trochoidal type, and more particularly to such engines having supercharging means rendering them suitable for either diesel or hybrid operation.

Various attempts have been made to adapt rotary engines of the trochoidal type to diesel operation, but have not been entirely successful for various reasons. In U. S. Pat. No. 3,405,692 there is shown an engine with a two-lobed trochoid, in which to get enough gaseous charge to attain the degree of compression necessary for the diesel process a supercharger takes in fresh charge through the intake chamber of the engine, then transfers it back to the compression zone of the engine. Since the two-lobed trochoid does not have a long enough expansion stroke to take full advantage of diesel expansion, the partially expanded combustion gases are exhausted from the engine through a transfer passage to drive the supercharger by their further expansion. Such an engine is very bulky, and there are extensive throttling losses which reduce the power output. Throttling loss is great in transferring fresh charge from the engine to the supercharger and back again, and the engine exhaust is throttled during transfer to drive the supercharger, resulting in a further loss of power.

U. S. Pat. No. 2,988,065 shows a three-lobed trochoid in which two chambers are used for prolonged expansion. However, this is a machine in which both the inner body and the outer housing rotate, gas pressure being exerted to drive both elements. Further, there is no provision for increasing the amount of charge, the intake being limited to the amount which can be inspired by a single chamber of the machine. The geometry of a trochoidal engine is such that it is doubtful that the degree of compression required for diesel operation could be obtained in this manner.

SUMMARY

This invention provides a trochoidal engine operable in either the hybrid process or the diesel process, in which complete combustion and power utilization are obtained in the operative chambers of the engine itself, and having an over-all size comparable to that of a two-lobed trochoidal engine of the same power output operating in the Otto cycle.

This result is achieved by providing a three-lobed trochoidal engine, having mounted on the same shaft a one-lobed trochoidal machine which operates as a compressor, the rotor of the compressor serving as the sole counterweight for the rotor of the combustion engine. The two devices are separated by an intermediate wall through which runs a transfer passage to convey the output of the compressor to the intake chamber of the engine, the intermediate wall being made very thin in order to restrict the length of the transfer passage and reduce throttling losses. The axes of symmetry of the three-lobed trochoid and the one-lobed trochoid are angularly offset by about 10° to 30°, in order to match the phases of the two machines such that the transfer passage may run through the intermediate wall in as nearly a straight axial direction as possible. This disposition also permits that the thin intermediate wall, in the high pressure combustion region of the engine, is backed up by the thick portion of the one-lobed trochoidal housing.

In order to secure prolonged expansion of the combustion gases and extract full work therefrom, after the gases have expanded through substantially one full lobe of the three-lobed engine the travel of the rotor opens an overflow channel disposed in the housing and communicating with the next downstream chamber, so that expansion continues in two communicating chambers of increasing volume until the further travel of the rotor opens the exhaust port, after which the two communicating chambers decrease in volume to expel the exhaust.

At about the point where the exhaust port opens, the rotor uncovers an auxiliary fresh air port in the exhausting chambers. Fresh air is introduced into the exhaust to promote complete combustion of the gases for cleaner exhaust, and also aids in scavenging the chambers.

It is therefore an object of this invention to provide a supercharged diesel engine of the trochoidal type.

It is another object to provide a supercharged engine capable of operation in the hybrid process.

A further object is to provide an internal combustion engine having provision for more complete combustion and cleaner exhaust.

Other objects and advantages will become apparent on reading the following specification in conjunction with the accompanying drawings.

BRIEF DESCRIPTION OF THE DRAWINGS

FIG. 3 is a semischematic cross-section of the engine viewed in the axial direction;

FIGS. 4 and 5 are semischematic cross-sections, showing correlated rotor positions of the engine and the compressor; and FIG. ' IS AN ENLARGED FRAGMENTARY CROSS-section of a portion of the engine.

DESCRIPTION OF THE PREFERRED EMBODIMENTS

Figure 1:
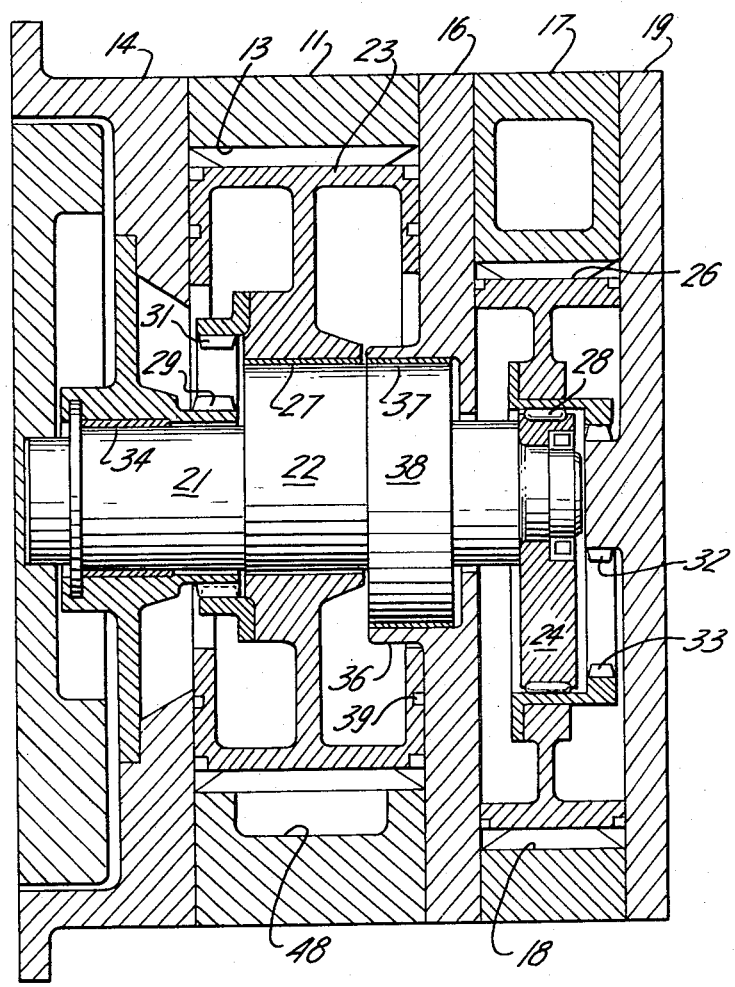
FIG. 1 is an elevational cross-section of the engine and compressor of the invention, taken generally on line 1—1 of FIG. 4.

In FIG. 1 there is shown a trochoidal housing 22 defining a cavity 13 of three lobes, having a side wall 14 and closed at its other end by an intermediate wall 16. On the other side of the intermediate wall is a trochoidal housing 17 defining a cavity 18 of one lobe, and closed by an end wall 19. A shaft 21 transpierces end wall 14 and intermediate wall 16 and extends into the one-lobbed cavity 18. The shaft bears an eccentric portion 22 within the cavity 13, on which is rotatably mounted a rotor 23 having a profile of approximately the inner envelope of the three-lobed trochoid, that is, generally rectangular with four apex portions and arcuate sides. Within the cavity 18 the shaft bears a second eccentric portion 24, on which is rotatably mounted a two-apexed rotor 26 which has a profile approximately the inner envelope of the one-lobed trochoid. The two eccentrics are 180° apart on the shaft, so that the compressor rotor serves as the sole counterweight of the engine rotor.

Rotor 23 turns on its eccentric on a sleeve bearing 27, and rotor 26 on roller bearings 28. Extending from end wall 14 is a fixed gear 29 surrounding the shaft, in mesh with a ring gear 31 borne by the rotor 23, the gears being in the ratio of 3:4. A fixed gear 32 is borne on a boss extending inwardly from the other end wall 19, and meshes with a ring gear 33 borne by rotor 26, these gears being in the ratio of 1:2. The gears are timing gears only for the purpose of assisting in maintaining the phase, power being transmitted between the rotors and their associated eccentrics.

The end wall 74 supports a bearing 34 surrounding the shaft at the output end. The intermediate wall 16 has a cup-like bearing support 36 surrounding the shaft and containing the main bearing 37 in which is positioned an enlarged journal portion 38 of the shaft. The cup-like bearing support 36 extends axially into cavity 13 as far as practicable, within the rotor and radially inside the path described by the oil seal 39 carried by the rotor end face, and very nearly to the plane of the face of eccentric 22. By this means it is possible to obtain adequate axial length of the main bearing, without increasing the over-all axial length of the engine. Further, the four-apexed shape of the rotor 23 permits great radial extension of the main bearing and its mating journal, so that it is possible to dispense with a shaft bearing in the compressor cavity 18, the shaft being overhung in this portion. The pinion gear 32 of the compressor being necessarily rather small in diameter in order to provide the 1:2 ratio, is thus not weakened by having a shaft passing through it.

Figure 2:
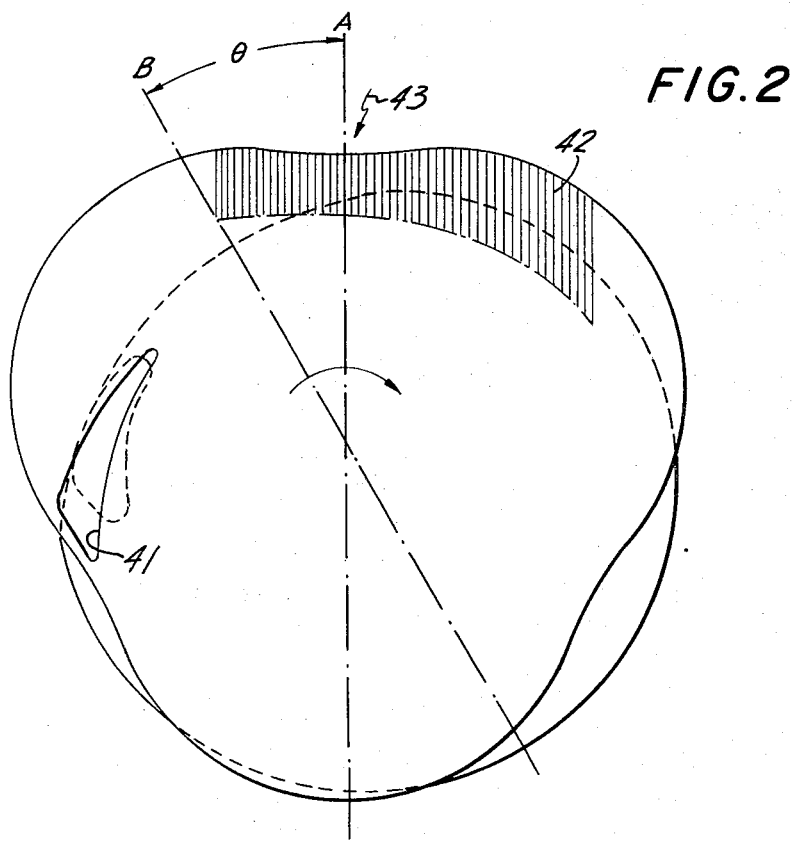
FIG. 2 is a schematic representation of the angular correlation of the trochoids of the engine housing and the compressor housing.

FIG. 2 shows schematically the angular orientation of the two trochoids with respect to each other. The axis of symmetry of the three-lobed trochoid is indicated by the centerline marked A, and and the axis of symmetry of the one-lobed trochoid is marked B. The axis B of the one-lobed trochoid is offset in the upstream direction from the axis A by the angle $\theta$ which may be from about 10° to 30°. This insures that the transfer passage 41 through the intermediate wall will have its openings into the engine cavity 13 and the compressor cavity 18 as nearly opposite one another as possible. This, with the small axial dimension of intermediate wall 16, permits having the transfer passage as short as possible and occupying as little circumferential space as possible. There is a further advantage in this orientation. The shaded region 42 in FIG. 2 is the region of ignition and initial combustion, that is, of maximum pressured The thin intermediate wall is, therefore, supported at this point by having the heavy portion of the casing of the compressor behind it.

In FIG. 3 there is shown a view of the internal combustion engine along the axis, with the end wall 74 removed. The rotor 23 is shown in the position at which the intaking chamber 51 has reached maximum volume, when it has received its full charge of compressed air from the compressor through the transfer passage 41, and just before rotor 23 will close the transfer passage and begin further compression. A sparkplug is schematically indicated by the lighting arrow 43, such a sparkplug being necessary only when it is desired to operate the engine in the hybrid mode. Chamber 52 has been fired and is in the expansion stage, driving the rotor, and chamber 54 is exhausting through exhaust port 47. In the shell of housing 11 is provided an overflow channel 48 which in certain rotor positions places two expansion chambers in communication, thereby allowing a long period of expansion to take full advantage of diesel or hybrid operation. As shown in FIG. 3, the rotor apex is just about to pass the upstream end of the transfer channel, thereby opening communication between chambers 52 and 53.

The operation of the engine will be further understood by reference to FIGS. 4 and 5. In these semischematic representations, the compressor has been displaced, for clarity of illustration, above the combustion engine, maintaining the rotors of both devices in proper phase relationship. The axes of symmetry of the two trochoids are shown by the centerlines A and B, as in FIG. 2.

In FIG. 4 air sucked in by the compressor rotor 26 through intake port 49 is being compressed in the left hand chamber of the compressor and into transfer passage 41. Rotor 23 of the engine is just beginning to open the orifice of the transfer passage on the engine side, whereupon the compressed air enters the induction chamber 51 of the engine.

At the end of the air-transfer portion of the stroke, as shown in FIG. 5, passage 41 will be closed on the compressor side by the two-apexed rotor, and on the engine side by the four-apexed rotor. The compressor rotor thereupon begins another induction stroke, while the engine rotor further compresses the air or fuel-air mixture in chamber 51, as in chamber 52 of FIG. 4. A fuel injector 55 is provided at a suitable location for diesel operation. The spark ignition shown in FIG. 3 may also accompany the injector for hybrid operation, or if the compressor is inducting a carbureted fuel-air mixture, spark ignition alone may be used.

After expanding chamber 52 passes the stage of single expansion shown in FIG. 3, it reaches the position shown in FIG. 5, in which the overflow channel 48 is opened by passage of the rotor apex across its upstream end, thus placing chamber 52 in communication with chamber 53 and permitting further expansion of the gases in the enlarged volume available. When the rotor turns still further it reaches the position shown in FIG. 4 as the previous cycle, opening the exhaust port again. Just about at the time the rotor uncovers the exhaust port 47 it also uncovers a fresh air port 56 disposed near the cusp of the epitrochoid in the region of the overflow channel. Fresh air is introduced through port 56 into the burning exhaust gases, by which means combustion is enhanced and completed before emergence of the exhaust through port 47. The rapid flow of gas across the air port 56 tends to aspirate fresh air into the chamber, but if necessary the air may be given a positive pressure by suitable pumping means (not shown).

As the rotor turns somewhat further from the position shown in FIG. 4, the downstream edge of overflow channel 48 is closed by the rotor overrun, and chamber 53 will then contain principally air, which is then recompressed as the rotor continues to the position shown in FIG. 3. At this point the pressure in the chamber of compressed air is substantially that of the next following expansion chamber, so that there is no sharp alteration of pressure as the rotor again uncovers the upstream edge of the overflow channel.

Figure 6:
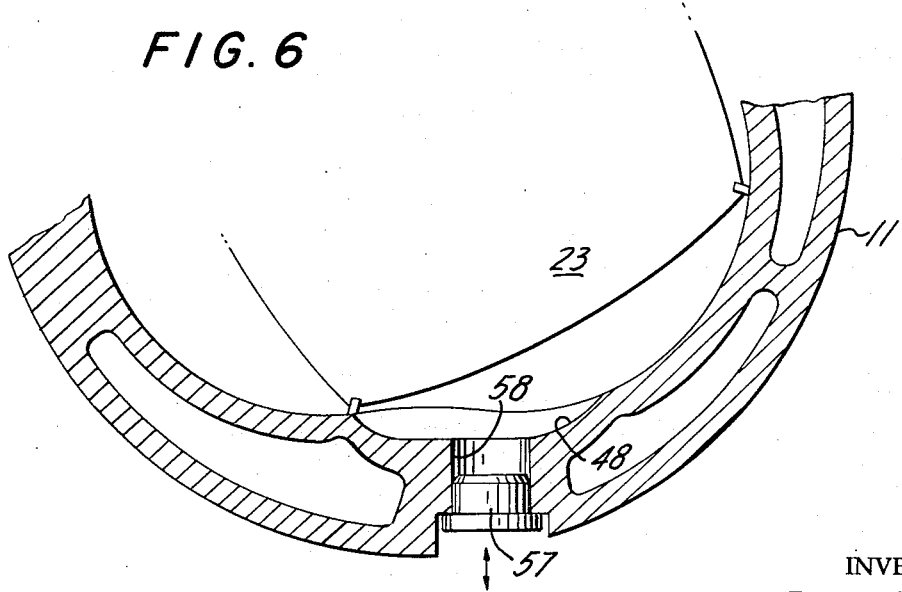

FIG. 6 shows a radially reciprocable regulatory piston 57 disposed in a bore 58 communicating with the overflow channel 48. The movement of the piston may be made dependent on load, speed, or temperature by linkage with means responsive to manifold pressure, means responsive to speed of engine revolution, means responsive to exhaust gas temperature, and the like. By this means the volume of the overflow channel can be varied.

What is claimed is:

1. A rotary internal combustion engine comprising in combination a three-lobed trochoidal peripheral engine housing, a one-lobed trochoidal peripheral compressor housing coaxial therewith, an intermediate side wall disposed between the two housings, a first side wall closing the three-lobed housing, a second side wall closing the one-lobed housing, a shaft transpiercing the first side wall and the intermediate wall and extending into the one-lobed housing, the shaft having a first eccentric portion within the three-lobed cavity with a four-apexed engine rotor mounted thereon and rotatable within the cavity, the shaft having a second eccentric portion within the one-lobed cavity with a two-apexed compressor rotor mounted thereon and rotatable within the cavity, the one-lobed cavity having an intake port for intake of fresh gas, the intermediate wall having a transfer passage therethrough, the two-apexed rotor compressing the fresh gas within the one-lobed cavity and transferring the compressed gas through the transfer channel to the three-lobed cavity, the engine rotor further compressing the gas for combustion and extraction of power therefrom.

2. The combination recited in claim 1, wherein the axis eccentric symmetry the second eccentric are disposed 180° apart on the shaft, and the compressor rotor is the sole counterweight for the engine rotor.

3. The combination recited in claim 2, wherein the axis symmetry SYMMETRY of the one-lobed trochoid is offset from about 10° to about 30° in the upstream direction with respect to the axis of symmetry of the three-lobed trochoid.

4. The combination recited in claim 3, wherein the shaft bears a journal portion of larger diameter than the first eccentric and adjacent thereto, the engine rotor is recessed on the side facing the intermediate wall, the intermediate wall has a bearing support extending axially within the rotor recess, and the main bearing is positioned within the bearing support and surrounds the enlarged journal portion.

5. The combination recited in claim 4, wherein the shaft and the compressor rotor mounted thereon are overhung within the compressor cavity.

6. The combination recited in claim 1, wherein the three-lobed housing of the engine contains a compression chamber, a first expansion chamber, and a second expansion chamber having an exhaust port therein, and there is formed in the housing wall an overflow channel communicating between the first and second expansion chambers, the overflow channel being opened between the chambers by the engine rotor before the first expansion chamber has reached its maximum volume and when approximately equal pressures exist in both expansion chambers, so that expansion continues in both chambers until opening of the exhaust port by continued rotation of the engine rotor.

7. The combination recited in claim 6, wherein the engine has an air intake port disposed in a side wall in a position such that it is opened by the rotor to the first and second expansion chambers during the period of their intercommunication, and fresh air is mixed with the expanding gases to enhance combustion during exhaust.

8. The combination recited in claim 7, wherein the engine housing wall has a bore communicating with the overflow channel, and a piston disposed within the bore for regulating the volume of the transfer channel.

9. The combination recited in claim 7, wherein the peripheral housing of the compressor is thick in the region axially aligned with the region of highest pressure in the engine, so that the intermediate wall is braced in the high pressure region by the thick portion of the compressor wall.

* * * * *